United States Patent Office 2,866,810
Patented Dec. 30, 1958

2,866,810

MANUFACTURE OF PHOSPHORODICHLORIDITES

Henry Tolkmith, Midland, Mich., assignor to The Dow Chemical Company, Midland, Mich., a corporation of Delaware No Drawing. Application June 6, 1957
Serial No. 663,882

3 Claims. (Cl. 260—461)

The present invention is concerned with an improved method for the manufacture of phosphorodichloridites having the formula

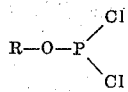

In this and succeeding formulas, R represents chlorophenyl or 2-chloro-4-loweralkylphenyl. The term "loweralkyl" refers to alkyl radicals containing from 1 to 5 carbon atoms, inclusive. These compounds are valuable as intermediates for the preparation of more complex phosphorus derivatives and particularly for the production of O-aryl O-alkyl phosphorochloridothioates, O-aryl O-alkyl phosphoroamidothioates and O-aryl O,O-dialkyl phosphorothioates. In such use, the O-(chlorophenyl) phosphorodichloridite or O-(2-chloro-4-loweralkylphenyl) phosphorodichloridite is reacted with sulfur or phosphorus thiochloride ($PSCl_3$) to form the corresponding phosphorodichloridothioates. The phosphorodichloridothioates may then be (1) reacted with an alkali metal alcoholate to replace one chlorine atom, (2) reacted successively with an alkali metal alcoholate and with ammonia to replace both chlorine atoms, and (3) reacted with an alkali metal alcoholate to replace both chlorine atoms. The resulting phosphorochloridothioates, phosphoroamidothioates and phosphorothioates are useful as preservatives for paint, paper and wood and as parasiticides for the control of bacteria, fungi, mites and insects such as aphids and houseflies.

Several methods for preparing O-(chlorophenyl) phosphorodichloridites are known. In one method, the compounds may be prepared by the reaction of a chlorophenol with an excess of phosphorus trichloride at a temperature at which hydrogen chloride of reaction is evolved. Upon the substantial cessation of the evolution of hydrogen chloride, the reaction mixture is fractionally distilled under reduced pressure to separate the desired phosphorodichloridite. This method gives yields of about 60 percent of the phosphorodichloridite corresponding to a conversion of about 60 percent of the employed chlorophenol reactant.

In another method of preparing the O-chlorophenyl phosphorodichloridites, one molecular proportion of the chlorophenol and at least 4 molecular proportions of phosphorus trichloride are mixed together with a small amount of magnesium chloride as a catalyst and the resulting mixture warmed at a temperature at which hydrogen chloride of reaction is evolved. Upon the substantial cessation of hydrogen chloride evolution, the desired product is separated by fractional distillation under reduced pressure. This method results in yields of not more than about 75 percent of the desired phosphorochloridite based upon the chlorophenol starting material.

It is an object of the present invention to provide a new and improved method for the manufacture of O-(chlorophenyl) phosphorodichloridites and O-(2-chloro-4-loweralkylphenyl) phosphorodichloridites. A further object is to provide a method which gives O-(chlorophenyl) phosphorodichloridites and O-(2-chloro-4-loweralkylphenyl) phosphorodichloridites in a greater yield than has previously been obtainable by known methods. Other objects will become apparent throughout the following specification and claims.

The new and improved process comprises mixing one molecular proportion of a chlorophenol having the formula

R—OH with at least 4 molecular proportions of phosphorus trichloride and causing at least 0.25 molecular proportion of the chlorophenol to react with phosphorus trichloride by heating the resulting mixture at a temperature at which hydrogen chloride of reaction is evolved. Upon the conversion of at least one-fourth of the employed chlorophenol reactant as may be determined by chemical analysis, magnesium chloride is added to the reaction mixture in a catalytic amount and the resulting mixture heated for a period of time at a temperature at which hydrogen chloride of reaction is evolved. Upon substantial cessation of hydrogen chloride evolution, the reaction mixture may be filtered to remove the catalyst and the filtrate fractionally distilled under reduced pressure to separate the desired product as a viscous liquid. This new process has been found to give greater yields of the O-(chlorophenyl) phosphorodichloridites and O-(2-chloro-4-loweralkylphenyl) phosphorodichloridites than have previously been obtainable by known methods.

In order to obtain the very desirable and high yields of the O-(chlorophenyl) phosphorodichloridites and O-(2-chloro-4-loweralkylphenyl) phosphorodichloridites, it is critical and essential that at least 0.25 molecular proportion of the chlorophenol reactant is caused to react with phosphorus trichloride prior to the addition of the magnesium chloride catalyst and the subsequent completion of the reaction. The addition of the catalyst prior to the conversion of this proportion of the chlorophenol reactant markedly reduces the yields of the desired phosphorodichloridites.

Although the exact mechanics of the reaction are not understood, good results are obtained when employing at least four molecular proportions of phosphorus trichloride with each molecular proportion of the chlorophenol reactant and subsequently adding to the reaction mixture as previously described a catalytic amount of magnesium chloride. In the preferred method of the invention, one molecular proportion of chlorophenol is employed with from 4 to 7 molecular proportions of the phosphorus trichloride and from 0.01 to 0.5 molecular proportion of catalyst. A greater excess of phosphorus trichloride may be employed but is undesirable from the standpoint of economy.

The reaction of the present invention takes place smoothly with the formation of the desired phosphorodichloridite at temperatures at which hydrogen chloride is formed as a product of reaction. Good results are obtained when operating at temperatures of from 70° C. to the boiling temperature of the reaction mixture. In a convenient method, the reaction is carried out at the boiling temperature of the reaction mixture and under reflux.

The rate at which the reaction takes place has been found to vary directly with the temperature at which the reaction is carried out, the longer contacting periods being employed at the lower temperatures.

In carrying out the method of the present invention, at least 4 molecular proportions of phosphorus trichloride and one molecular proportion of chlorophenol or 2-chloro-4-loweralkylphenol are mixed together and heated in the absence of a catalyst at a temperature at which hydrogen chloride of reaction is evolved and until at least 0.25 molecular proportion of the chlorophenol reactant has reacted with phosphorus trichloride. As the reaction proceeds, samples may be withdrawn from the reaction mixture and analyzed chemically or spectroscopically (molecular or infrared spectroscopy) to determine the amount of conversion of the chlorophenol reactant. Following the conversion of at least 0.25 molecular proportion of the phenol reactant, anhydrous, powdered magnesium chloride is added to the reaction mixture and the heating thereafter continued at a temperature at which hydrogen chloride of reaction is evolved. Upon the substantial cessation of hydrogen chloride evolution, the reaction mixture may be filtered to remove the catalyst and thereafter fractionated under reduced pressure to separate the desired O-(chlorophenyl) phosphorodichloridite or O-(2-chloro-4-loweralkylphenyl) phosphorodichloridite.

The following examples illustrate the invention but are not to be construed as limiting:

*Example 1.—O-(2,4,5-trichlorophenyl) phosphorodichloridite*

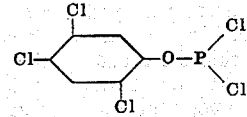

One mole (198 grams) of 2,4,5-trichlorophenol was mixed with 5 moles (690 grams) of phosphorus trichloride and the resulting mixture heated with stirring at a temperature at which hydrogen chloride of reaction was evolved. The heating was carried out at the boiling temperature of the reaction mixture and under reflux for 20 hours. Toward the end of the heating period, no further substantial amounts of hydrogen chloride were evolved. After this period of time, the reaction mixture was found to contain unreacted 2,4,5-trichlorophenol in the amount of 40.1 percent of the original quantity used as determined by infrared analysis. Two grams of magnesium chloride was then added to the reaction mixture and the resulting mixture heated with stirring at a temperature at which hydrogen chloride of reaction was evolved and until the evolution of hydrogen chloride was substantially complete. The heating was carried out at the boiling temperature of the reaction mixture and under reflux for 20 hours. Toward the end of the heating period, no further substantial amounts of hydrogen chloride were liberated. The reaction mixture was then filtered to remove the catalyst and the filtrate thereafter fractionally distilled under reduced pressure to separate an O-(2,4,5-trichlorophenyl) phosphorodichloridite product as a viscous, colorless liquid boiling at 142°–143° C. at 5 millimeters pressure. This product was obtained in a yield of 88 percent based upon the 2,4,5-trichlorophenol starting material.

In a further operation, one mole of 2,4,5-trichlorophenol, 5 moles of phosphorous trichloride and 2 grams of magnesium chloride were mixed together and heated with stirring at a temperature at which hydrogen chloride of reaction was evolved and until the evolution of hydrogen chloride was substantially complete. The heating was carried out at the boiling temperature of the reaction mixture and under reflux for 20 hours. Toward the end of the heating period, no further substantial amounts of hydrogen chloride were liberated. The reaction mixture was then processed as above described to obtain an O-(2,4,5-trichlorophenyl) phosphorodichloridite product in a yield of 76 percent based upon the 2,4,5-trichlorophenol starting material.

*Example 2*

A mixture of one mole (198 grams) of 2,4,5-trichlorophenol and 5 moles (690 grams) of phosphorus trichloride was heated with stirring at the boiling temperature and under reflux for 8 hours. After this period of time, the reaction mixture was found to contain unreacted 2,4,5-trichlorophenol in the amount of 69.8 percent of the original quantity used as determined by infrared analysis. Two grams of magnesium chloride was then added to the reaction mixture and the resulting mixture heated at the boiling temperature and under reflux for 20 hours. Toward the end of the heating period, the evolution of hydrogen chloride had substantially ceased. The reaction mixture was thereafter processed as described in Example 1. The yield of O-(2,4,5-trichlorophenyl) phosphorodichloridite was 84.3 percent based upon the 2,4,5-trichlorophenol starting material.

*Example 3.—O-(2-chloro-4-tertiarybutylphenyl) phosphorodichloridite*

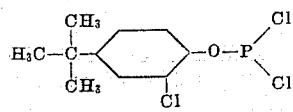

A mixture of one mole (185 grams) of 2-chloro-4-tertiarybutylphenol and 5 moles (690 grams) of phosphorus trichloride was heated with stirring at the boiling point and under reflux for 12 hours. After this period of time, the reaction mixture was found to contain unreacted 2-chloro-4-tertiarybutylphenol in the amount of 38.7 percent of the original quantity used as determined by infrared analysis. Two grams of magnesium chloride was then added to the reaction mixture and the resulting mixture heated at the boiling temperature and under reflux for 12 hours. Toward the end of this period, the evolution of hydrogen chloride of reaction was substantially complete. The reaction mixture was then filtered to remove the catalyst and the filtrate fractionally distilled under reduced pressure to obtain an O-(2-chloro-4-tertiarybutylphenyl) phosphorodichloridite product as a viscous, colorless liquid boiling at 145°–147° C. at 5 millimeters pressure. This product was obtained in a yield of 94 percent based upon the 2-chloro-4-tertiarybutylphenol starting material.

In a further operation, one mole of 2-chloro-4-tertiarybutylphenol, 5 moles of phosphorus trichloride and 2 grams of magnesium chloride were mixed together and heated with stirring at a temperature at which hydrogen chloride of reaction was evolved. The heating was carried out at the boiling temperature of the reaction mixture and under reflux for 12 hours. Toward the end of the heating period, no further substantial amounts of hydrogen chloride were liberated from the reaction mixture. The reaction mixture was then processed as described in Example 1 to obtain an O-(2-chloro-4-tertiarybutylphenyl) phosphorodichloridite product in a yield of 68.9 percent based upon the 2-chloro-4-tertiarybutylphenol starting material.

*Example 4*

One mole (185 grams) of 2-chloro-4-tertiarybutylphenol was mixed with 5 moles (690 grams) of phosphorus trichloride and the resulting mixture heated with stirring at the boiling temperature and under reflux for 5 hours. After this period of time, the reaction mixture was found to contain unreacted 2-chloro-4-tertiarybutylphenol in the amount of 67.2 percent of the original quantity used as determined by infrared analysis. Two grams of magnesium chloride was then added to the reaction mixture and the resulting mixture heated at the boiling temperature and under reflux for 12 hours. Toward the end of the heating period, the evolution of hydrogen chloride of reaction was substantially complete. The reaction mixture was thereafter processed as described in Example 3 to obtain an O-(2-chloro-4-tertiarybutylphenyl) phosphorodichloridite product in a yield of 86 percent.

The reaction of other substituted phenols including 2-chlorophenol, 2,4-dichlorophenol, 2,5-dichlorophenol, 2,6-dichlorophenol, 2-chloro-4-methylphenol, 2-chloro-4-isopropylphenol and 2-chloro-4-amylphenol with phosphorus trichloride in the manner as described and illustrated gives the same improved and desirable yields of O-(2-chlorophenyl) phosphorodichloridite, O-(2,4-dichlorophenyl) phosphorodichloridite, O-(2,5-dichlorophenyl) phosphorodichloridite, O-(2,6-dichlorophenyl) phosphorodichloridite, O-(2-chloro-4-methylphenyl) phosphorodichloridite, O-(2-chloro-4-isopropylphenyl) phosphorodichloridite and O-(2-chloro-4-amylphenyl) phosphorodichloridite, respectively.

I claim:

1. In a method wherein one molecular proportion of a substituted phenol having the formula

R—OH is mixed with at least 4 molecular proportions of phosphorus trichloride and the resulting mixture heated at a temperature at which hydrogen chloride of reaction is evolved to produce a reaction resulting in the production of a phosphorodichloridite having the formula $$R-O-P\begin{matrix}Cl\\Cl\end{matrix}$$

in which the substituent R in the above formulas represents a member of the group consisting of chlorophenyl and 2-chloro-4-loweralkylphenyl, the improvement which comprises (1) causing at least 0.25 molecular proportion of the substituted phenol to react with the phosphorus trichloride in the absence of a catalyst and (2) thereafter completing the reaction in the presence of magnesium chloride as catalyst.

2. A method of preparing O-(2,4,5-trichlorophenyl) phosphorodichloridite which comprises heating a mixture of one molecular proportion of 2,4,5-trichlorophenol and at least 4 molecular proportions of phosphorus trichloride at a temperature at which hydrogen chloride of reaction is evolved until at least 0.25 molecular proportion of said phenol has reacted and thereafter completing the reaction in the presence of magnesium chloride as catalyst.

3. A method of preparing O-(2-chloro-4-tertiarybutylphenyl) phosphorodichloridite which comprises heating a mixture of one molecular proportion of 2-chloro-4-tertiarybutylphenol and at least 4 molecular proportions of phosphorus trichloride at a temperature at which hydrogen chloride of reaction is evolved until at least 0.25 molecular proportion of said phenol has reacted and thereafter completing the reaction in the presence of magnesium chloride as catalyst.

References Cited in the file of this patent

UNITED STATES PATENTS

| | | |
|---|---|---|
| 1,858,659 | Britton | May 17, 1932 |
| 2,071,017 | Bass | Feb. 16, 1937 |
| 2,500,022 | Brown | Mar. 7, 1957 |